United States Patent [19]

Tanaka

[11] Patent Number: 4,581,663
[45] Date of Patent: Apr. 8, 1986

[54] BURIED SERVO RECORDING SYSTEM HAVING DUAL TRANSDUCERS

[75] Inventor: Hideo Tanaka, Tokyo, Japan

[73] Assignee: NEC Corporation, Tokyo, Japan

[21] Appl. No.: 547,265

[22] Filed: Oct. 31, 1983

[30] Foreign Application Priority Data

Nov. 2, 1982 [JP] Japan .................................. 57-193184
Mar. 28, 1983 [JP] Japan .................................. 58-51825

[51] Int. Cl.[4] ........................... G11B 5/27; G11B 5/56
[52] U.S. Cl. ...................................... 360/77; 360/103
[58] Field of Search ................ 360/77, 103, 108, 129, 360/121

[56] References Cited

U.S. PATENT DOCUMENTS

| | | | |
|---|---|---|---|
| 3,404,392 | 10/1968 | Sordello | 360/77 |
| 3,614,756 | 10/1971 | McIntosh et al. | 360/77 |
| 3,956,769 | 5/1976 | Beecroft et al. | 360/77 |
| 4,157,576 | 6/1979 | Hack et al. | 360/77 |
| 4,318,141 | 3/1982 | Haynes | 360/77 |

FOREIGN PATENT DOCUMENTS

| | | | |
|---|---|---|---|
| 54-139711 | 10/1979 | Japan | 360/103 |
| 55-125530 | 9/1980 | Japan | 360/103 |
| 58-115664 | 7/1983 | Japan | 360/78 |

Primary Examiner—George G. Stellar
Attorney, Agent, or Firm—Sughrue, Mion, Zinn, Macpeak & Seas

[57] ABSTRACT

A magnetic recorder has a pair of first and second transducers arranged in the longitudinal direction of a record track. The magnetic recorder exchanges signals with a magnetic record medium having a servo control signal prerecorded in a lower layer of said medium. A recording circuit is connected to the first transducer for recording a data signal along the record track in an upper layer of the medium. A reading circuit is connected to one of the first and second transducers for reading the recorded data signal. To the second transducer is connected a servo control circuit connected for reading the prerecorded servo control signal and deriving therefrom a position error signal in response to which the position of the transducers is controlled.

6 Claims, 6 Drawing Figures

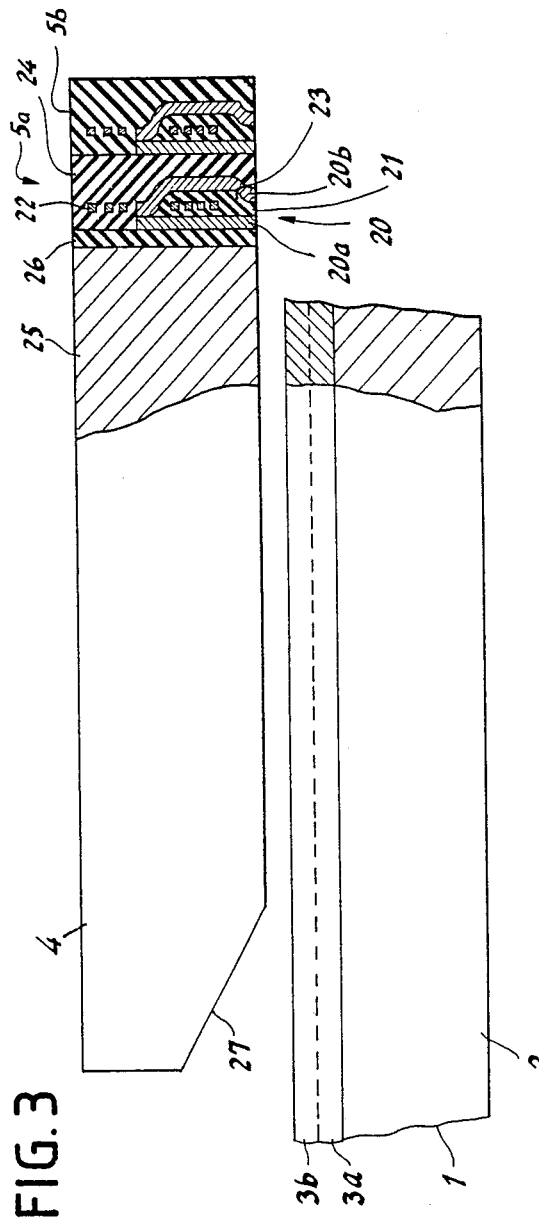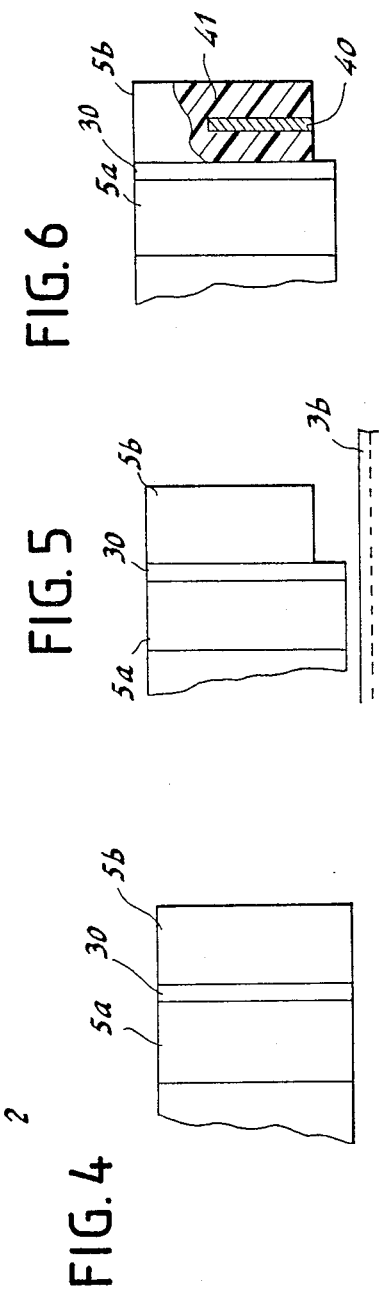

BURIED SERVO RECORDING SYSTEM HAVING DUAL TRANSDUCERS

BACKGROUND OF THE INVENTION

The present invention relates to magnetic recording systems, and more particularly to high track density recording systems employing buried servos for faithful track following operations.

Buried servos have been recognized as an effective means for faithful track positioning control. A prior art system typically shown and described in U.S. Pat. Nos. 4,313,140, 4,314,289 and 4,318,141 employs a single-gap transducer for recording a data signal while at the same time sensing prerecorded servo control signals. To effect this simultaneous writing and reading operation, it is necessary to minimize the effect of the counterelectromotive force (abbreviated counter emf) induced by the recording data signal on the signal-to-noise ratio of the servo control signals. For this purpose, the recording circuit of the system includes an AC bias and a high-pass filter to improve the signal-to-noise ratio of the servo control signals. A notch filter is further required to suppress the data signal of the frequencies to reduce the counter emf.

However, the signal-to-noise ratio of the servo control signals has been found to be still not satisfactory and the use of the aforesaid AC bias and filters adds to complexity with an attendant cost increase.

SUMMARY OF THE INVENTION

It is therefore an object of the present invention to provide an improved magnetic recorder that overcomes the problems associated with a prior art system of the type having a single-gap transducer.

In accordance with the present invention, a magnetic recorder has a pair of first and second transducers arranged in the longitudinal direction of a record track. The magnetic recorder is adapted to exchange signals with a magnetic record medium having a servo control signal prerecorded in a lower layer of said medium. A recording circuit is connected to the first transducer for recording a data signal along the record track in an upper layer of the medium. A reading circuit is connected to one of the first and second transducers for reading the recorded data signal. To the second transducer is connected a servo control circuit connected for reading the prerecorded servo control signal and deriving therefrom a position error signal in response to which the position of the transducers is controlled.

BRIEF DESCRIPTION OF THE DRAWINGS

The present invention will be described in further detail with reference to the accompanying drawings, in which:

FIG. 3 is an illustration of the detail of the transducers of FIGS. 1 and 2; and FIGS. 4, 5 and 6 are illustrations of modified embodiments of the transducers of FIG. 3.

DETAILED DESCRIPTION

Figure 1:
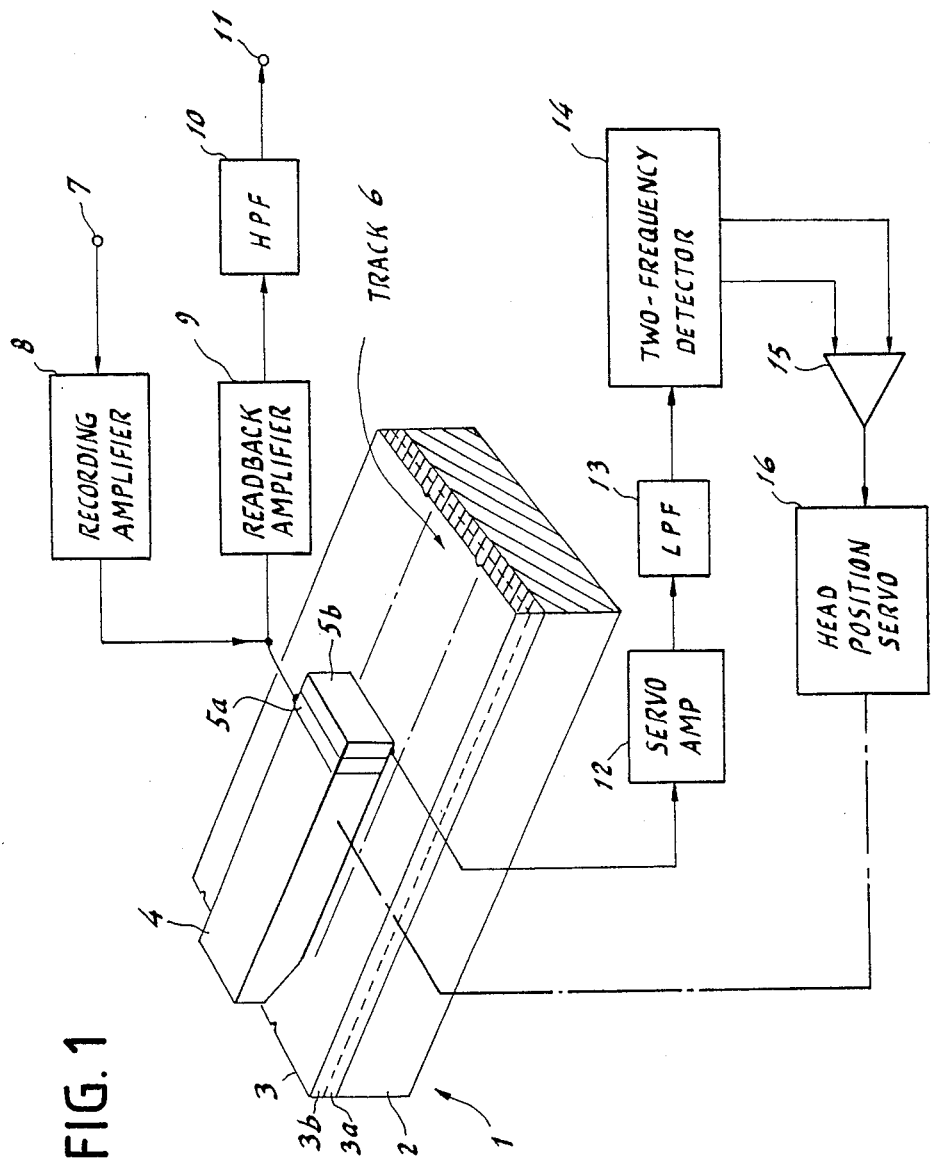
FIG. 1 is a schematic block diagram of a dual-transducer magnetic recorder according to a first embodiment of the invention.

Referring now to the drawings, like numerals indicate like parts having corresponding significance. A magnetic record medium 1 comprises a suitable substrate 2 supporting a magnetic coating 3. A slider 4 having a pair of transducers 5a and 5b in the rear scans a data track 6 along the surface of coating 3. The slider 4 has a relatively large bottom surface sufficient to produce an air cushion that enables it to float slightly above the surface of the record medium 1. In disk recording applications the slider 4 may be mounted on a movable arm which is driven by an actuator, not shown, in a direction perpendicular to the data tracks 6.

A recorder employing the present invention uses so-called buried servo or track position indicating signals. For data recording and readout operations it is assumed that such position indicating signals have already been recorded in a lower layer 3a of the coating 3 having a high retentivity by means of a transducer exclusively used for such purposes in a manner as described in the afore-mentioned U.S. Pat. No. 4,318,141.

As described in U.S. Pat. No. 3,404,392, the format of the lower layer consists of alternating adjacent bands of servo tracks. The first band consists of one servo frequency recorded continuously around the track and the second band consists of the other servo frequency recorded in like manner. The data track 6 is defined as the point where the transducers 5a and 5b lie half over the first servo track and half over the second servo track. In on-track condition, the readback signal contains equal amounts of the two servo frequencies and the data track is centered over the boundary between these servo tracks.

A digital data signal is supplied from a terminal 7 through a recording amplifier 8 to the transducer 5a. The amplifier 8 strengthens the signal so that the magnetic flux lines generated by the transducer 5a are confined in an upper layer 3b of the magnetic coating 3 having a lower retentivity than the lower layer 3a. A readback amplifier 9 is also connected to the transducer 5a which picks up data and position control signals during readback operations. The signals amplified by readback amplifier 9 are fed to a high-pass filter 10 to eliminate the position control signals and pass the data signal to an output terminal 11.

To the transducer 5b is connected a servo amplifier 12 which is coupled to a low-pass filter 13 for eliminating the data signal and passing the position control signals to a two-frequency detector 14 which detects the two servo frequencies. A differential amplifier 15 compares the servo frequency signals with each other to derive a position error signal. This position error signal is applied to a head position servo 16 to maintain on-track condition during record and readback operations.

Figure 2:
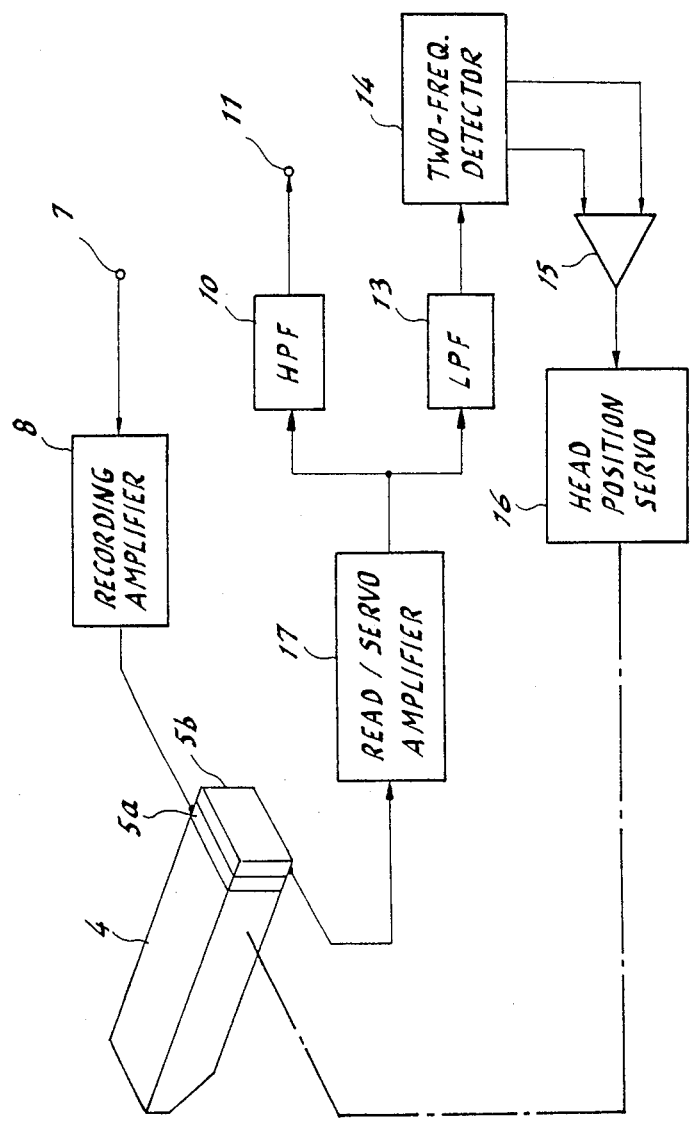
FIG. 2 is a schematic block diagram of a modified embodiment of the invention.

Preferably, the readback amplifier 9 and servo amplifier 12 are combined in a single read/servo amplifier as shown in FIG. 2. This read/servo amplifier 17 is connected to the transducer 5b. The amplified signals are fed to the low-pass filter 13 for servo control purposes as well as to the high-pass filter 10 for extracting the data signal.

Referring to FIG. 3, details of a preferred form of the slider 4 are illustrated. Transducers 5a and 5b are of identical construction, each comprising a core 20 having a magnetic gap 21 and a coil 22. The core 20 comprises a first core element 20a which is in the form of a layer formed by vacuum deposition of nickel-ferrite compound and a second core element 20b likewise formed by vacuum deposition. Between the core elements 20a and 20b is a section of the coil 22 which is embedded in an insulator 23. The remainder of the coil 22 is embedded in a bulk of insulator 24 with which the core structure 20 is entirely covered. A suitable material for the insulator 23 is $Al_2O_3$. The coil structure 22 is likewise formed by a vacuum deposition technique.

The transducers 5a and 5b are cemented together so that their pole faces run parallel with each other in a direction transverse to the data track. The length of gap 21 of each transducer, i.e., the length as measured along the longitudinal direction of track 6, is chosen to operate with the frequencies of the data and position control signals to be exchanged with coating 3. The transducers 5a and 5b are cemented by way of an insulative slab 26 to an insulative block 25. The block 25 forms a greater part of the slider structure and has its front lower edge bevelled as shown at 27 to enable it to ride on the air cushion as its scans over the medium 1.

A nonmagnetic slab 30 with a thickness of 30 to 100 micrometers may be interposed between the transducers 5a 5b, as shown at FIG. 4, to prevent the magnetic flux generated by transducer 5a during recording from interfering with the signal detected by the transducer 5b.

In the circuit arrangement of FIG. 1 wherein the transducer 5b is exclusively used for servo control purposes, it is desirable that the pole face of the transducer 5b be offset upwardly with respect to the pole face of the transducer as illustrated in FIG. 5. This offsetting serves to reduce the effect of higher harmonics of the servo frequencies, so that the signals detected by the transducer 5b each assume a single sinusoid.

An alternative embodiment of the slider is shown in FIG. 6. In this embodiment, the transducer 5b comprises a magnetoresistor 40 embedded in an insulative block 41.

Since the servo control circuit and recording circuits are isolated from each other, the invention eliminates the need for the AC bias, notch filter and high-pass filter as required in the recording circuit of the prior art system. Furthermore, since the servo control circuit is not affected by the counter emf which would otherwise be generated as a result of the recording signal, the signal-to-noise ratio of the position error signal is significantly improved.

Since the transducers 5a and 5b are arranged in the longitudinal direction of the track, they can be advantageously assembled with a tolerance of 50 micrometers while at the same time satisfying the required tolerance of ±0.1 micrometers for positioning. A further advantage of this arrangement resides in the fact that the servo control is not affected by the inherent difference in thermal expansion coefficient between the transducers and the record medium.

What is claimed is:

1. A magnetic recorder adapted to exchange signals with a magnetic record medium along a record track, said record medium having a servo control signal prerecorded in a lower layer of said medium comprising:

a slider adapted to scan said track having a sufficient amount of bottom surface to create an air cushion between it and the surface of the record medium;

a pair of first and second thin film magnetic transducers laminated to each other and mounted on said slider so that the pole faces of said transducers are transverse to the longitudinal direction of said track;

a recording circuit connected to said first transducer for recording a data signal along said track in an upper layer of said medium;

a readback circuit connected to one of said first and second transducers for reading the recorded data signal;

a servo control circuit connected to said second transducer for reading said prerecorded servo control signal and deriving therefrom a position error signal; and means for controlling the position of said slider in response to said position error signal so that said transducers are aligned on said track.

2. A magnetic recorder as claimed in claim 1, wherein said readback circuit is connected to said first transducer, and wherein said second transducer is offset with respect to said first transducer in a direction away from the surface of said record medium to eliminate higher harmonics of said prerecroded control signal.

3. A magnetic rocorder as claimed in claim 1, wherein said first and second transducers are of identical construction, wherein each of said first and second transducers comprises a deposited first layer of magnetic material, an insulated coil structure deposited on said first layer, and a second layer of magnetic material deposited on said insulated coil to form a magnetic core with said first layer of magnetic material, said first and second layers forming a magnetic gap therebetween.

4. A magnetic recorder as claimed in claim 1, wherein said second transducer comprises a magnetoresistor.

5. A magnetic recorder as claimed in claim 1, wherein said readback circuit is connected to said second transducer.

6. A magnetic recorder as claimed in claim 1, wherein said lower layer of the record medium has a higher retentivity than said upper layer.

* * * * *